UNITED STATES PATENT OFFICE.

FRANZ A. RODY, OF NEWARK, NEW JERSEY.

TREATMENT OF FELDSPAR, LEUCITE, AND THE LIKE.

1,151,533.

Specification of Letters Patent. Patented Aug. 24, 1915.

No Drawing. Application filed October 11, 1913. Serial No. 794,598.

*To all whom it may concern:*

Be it known that I, FRANZ A. RODY, a subject of the Emperor of Germany, residing at No. 258 Van Buren street, Newark, Essex county, State of New Jersey, have invented certain new and useful Improvements in the Treatment of Feldspar, Leucite, and the like; and I do hereby declare the following to be a full, clear, and exact description of the invention, such as will enable others skilled in the art to which it appertains to make and use the same.

The present invention relates to the treatment of silicates containing alkalis and alumina (such as feldspar, leucite, etc.) for the extraction and recovery of the alkalis and alumina.

The invention is based upon the discovery that if oxids of the alkali-earth metals are mixed with such silicates, in such proportion that for each molecule of silica, two molecules of the alkali-earth metal oxid are present, and if the mixture be then subjected to a sintering temperature, the result of the reaction is the formation of a silicate of the alkali-earth metal and the release of the alkali and alumina in a condition in which they are freely soluble in water. From their solutions, they can be readily recovered in a substantially pure form.

In localities where lime-stone, dolomite, and the like are readily obtainable, either calcined, or uncalcined, as the case may be, I prefer to use the same as the source of alkali-earth oxid, in the practice of the invention. It frequently happens, however, that the feldspar, leucite and like silicates to be treated, occur in places where limestone, dolomite, etc., are not found in abundance, and where the cost of transporting them from a distance is so great that it would not be economical to bring them to the place of use. Under such circumstances, I prefer to use alkali-earth metal salt (as, for instance, chlorid of calcium, or chlorid of magnesium,) which is capable of being broken up by the application of heat and steam. This alkali-earth metal chlorid, such as calcium chlorid, can, with advantage, be regenerated and recovered from a later stage of the process, in the form of a suitable solution, the use of the chlorid in solution resulting in a most intimate intermixture thereof with the silicates, and in a similar intimate mixture of the alkali-metal oxid produced from the chlorid before the decomposition of the silicates is effected. For instance, when using calcium chlorid, instead of lime or lime-stone, I make the mixture, as hereinbefore indicated, that is to say, I mix with the silicate, calcium chlorid in such proportion that for each molecule of silica, two molecules of the calcium chlorid shall be present. In heating this mixture, it is not raised at once to a sintering heat, but is first heated at a lower temperature, in the presence of steam, thereby forming, primarily, hydrochloric acid and calcium oxid. The hydrochloric acid may then be recovered, if so desired, in a suitable condenser, from the vapors given off in the operation. The temperature is then increased to a sintering heat, resulting, as before, in the production of an agglomerate wherein the silica is present as an alkali-earth metal silicate. The agglomerate thus produced is than crushed, boiled with water, and the soluble portion, containing the alumina and the alkalis in the form of alkali aluminate is separated by filtration.

In order to regenerate the calcium chlorid from the residue left after the lixiviation of the crushed sinter, the said residue is then treated, at a low temperature, with the hydrochloric acid produced in the preliminary heating of the original mixture, the hydrochloric acid gas being applied in vaporous form to the said residue. The result of this treatment is the formation of calcium chlorid and silica. The calcium chlorid is thereupon separated from the silica by lixiviation and washing, and is finally concentrated, the concentrated liquor thus obtained being thereupon utilizable for mixture with a new batch of feldspar, leucite, or other silicate to be treated, the use of the calcium chlorid in the form of such solutions having important advantages, briefly referred to above. As hereinbefore indicated, magnesium chlorid, or any other alkali-earth metal salt decomposable by heat, or by heat and steam, or otherwise, may be used instead of calcium chlorid.

In practice, I prefer to use a revolving furnace (as, for instance, a rotary horizontal or inclined cylindrical kiln), as the apparatus to be employed both for the primary decomposing reaction and for the sintering reaction referred to, but it will be understood that I do not limit myself to the employment of the revolving or rotary type of furnace, inasmuch as sintering apparatus of the well-known type of the Heberlein-Huntington pot converter, or of the type of the well-known Dwight-Lloyd sintering furnaces, which at the present time, are in extensive use for the agglomeration of fine ores, are likewise utilizable in the present instance.

The sintering temperature appropriate to the practice of the invention will differ somewhat in acordance with the character of the material treated, but will usually be a temperature which in its final stage will lie within the range of about 1150° C. to 1350° C.

What I claim is:

1. The method of recovering alkalis and alumina from feldspar, leucite and like silicates containing them, which comprises bringing to a sintering temperature a mixture containing the silicate together with an oxygen compound of an alkali-earth metal, in proportion to form an ortho-silicate of the alkali earth metal, and at the same time combining the alkali and alumina in water-soluble form; substantially as described.

2. The method of recovering alkalis and alumina from feldspar, leucite and like silicates containing them, which comprises bringing to a sintering temperature a mixture containing the silicate together with an oxygen compound of an alkali-earth metal, in proportion to form an ortho-silicate of the alkali earth metal, and at the same time combining the alkali and alumina in water-soluble form, and extracting the alkali and alumina from the sintered mass by water; substantially as described.

3. The method of recovering alkalis and alumina from feldspar, leucite and like silicates containing them, which comprises bringing to a sintering temperature a mixture containing the silicate together with an oxygen compound of an alkali-earth metal, in proportion to form an ortho-silicate of the alkali earth metal, and at the same time combining the alkali and alumina in water-soluble form, and extracting the alkali and alumina from the sintered mass by boiling the mass in water and by filtration; substantially as described.

4. The method of recovering alkalis and alumina from feldspar, leucite and like silicates containing them, which comprises bringing to a sintering temperature a mixture containing the silicate together with an oxygen compound of an alkali-earth metal, in proportion to form an ortho-silicate of the alkali earth metal, and at the same time combining the alkali and alumina in water-soluble form, crushing the sintered mass, boiling it in water, and filtering it; substantially as described.

5. The method of recovering alkalis and alumina from feldspar, leucite and like silicates containing them, which comprises the preliminary step of mixing a solution of an alkali-earth metal salt with the silicate, and decomposing said salt within the mixture to an oxid at a temperature below that of the reaction between the oxid with the silicates; substantially as described.

6. The method of recovering alkalis and alumina from feldspar, leucite and like silicates containing them, which comprises the preliminary step of mixing a solution of calcium chlorid with the silicates, and decomposing said calcium chlorid within the mixture to calcium oxid at a temperature below that of the reaction between the oxid with the silicates; substantially as described.

7. The method of recovering alkalis and alumina from feldspar, leucite and like silicates containing them, which comprises the preliminary step of mixing a solution of calcium chlorid with the silicate, and decomposing said calcium chlorid within the mixture to calcium oxid by means of steam and heat at a temperature below that of the reaction between the oxid with the silicates, and recovering the hydrochloric acid incident to the operation, for re-use; substantially as described.

8. The method of recovering alkalis and alumina from feldspar, leucite and like silicates containing them, which comprises mixing a solution of calcium chlorid with the silicate, and decomposing said calcium chlorid within the mixture to calcium oxid, then sintering the mass, thereby converting the alumina and alkali into water-soluble alkali and alumina, treating the residue with hydrochloric acid, thereby forming calcium chlorid therein, lixiviating out the calcium chlorid and concentrating, for re-use, the solution thus obtained; substantially as described.

9. The method of recovering alkalis and alumina from feldspar, leucite and like silicates containing them, which comprises mixing a solution of calcium chlorid with the silicate, and decomposing said calcium chlorid within the mixture to calcium oxid, by treating the mass with steam at a low temperature, recovering the hydrochloric acid incident to the operation, then sintering the mass thereby converting the alumina and alkali into water-soluble form, extracting the said water-soluble alkali and alumina, treating the residue with the hydrochloric acid primarily recovered, thereby forming calcium chlorid in said residue, lixiviating out the calcium chlorid and concentrating for re-use the solution thus formed; substantially as described.

In testimony whereof I affix my signature, in presence of two witnesses.

FRANZ A. RODY.

Witnesses:
E. E. DOUGHERTY,
H. M. BURKEY.